(12) United States Patent
Keohane et al.

(10) Patent No.: US 7,779,363 B2
(45) Date of Patent: Aug. 17, 2010

(54) ENABLING USER CONTROL OVER SELECTABLE FUNCTIONS OF A RUNNING EXISTING APPLICATION

(75) Inventors: Susann M. Keohane, Austin, TX (US);
Gerald F. McBrearty, Austin, TX (US);
Shawn P. Mullen, Buda, TX (US);
Jessica Murillo, Round Rock, TX (US);
Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 11/567,053

(22) Filed: Dec. 5, 2006

(65) Prior Publication Data

US 2008/0134071 A1   Jun. 5, 2008

(51) Int. Cl.
*G06F 3/048* (2006.01)
(52) U.S. Cl. ..................................... 715/769
(58) Field of Classification Search ................. 715/769
See application file for complete search history.

(56) References Cited

U.S. PATENT DOCUMENTS 6,310,631 B1   10/2001   Cecco et al.

OTHER PUBLICATIONS

Simmons, J Todd, "Communication between Tasks Not Programmed as Communicating Tasks", IBM Technical Disclosure Bulletin, Nov. 1994, vol. 37, Pub. 11, pp. 191-194, 3 pages.
Lection, D Martinez, "Method for Redirecting an Input Window to a Selected Target Window", IBM Technical Disclosure Bulletin, Sep. 1994, vol. 37, Pub. 9, pp. 169-170, 2 pages.
Microsoft Windows, "Working Efficiently", 1 page, copyright 2005 Microsoft Corporation [online], [print accessed on Nov. 30, 2006]. Retrieved from the internet <http//:www.microsoft.com/windowsME/using/workingefficiently/tips/back_to_desktop.asp>.

*Primary Examiner*—William L Bashore
*Assistant Examiner*—Daniel Um
(74) *Attorney, Agent, or Firm*—Matthew W. Baca; Amy J. Pattillo

(57) ABSTRACT

A function management tool detects a user selection to drag and drop a particular selectable button from a first interface of the management tool to a second interface of an instance of a running application of multiple existing applications accessible at a computer system, wherein the management tool runs separately from the plurality of existing applications, wherein a separate pre-designated function is associated with each selectable button. Responsive to the management tool detecting the user select the dragged and dropped selectable button from within the second interface of the instance of the running application of the plurality of existing applications, the management tool controls the instance of the running application of the plurality of existing applications according to a particular pre-designated function of the dragged and dropped selectable button.

20 Claims, 5 Drawing Sheets

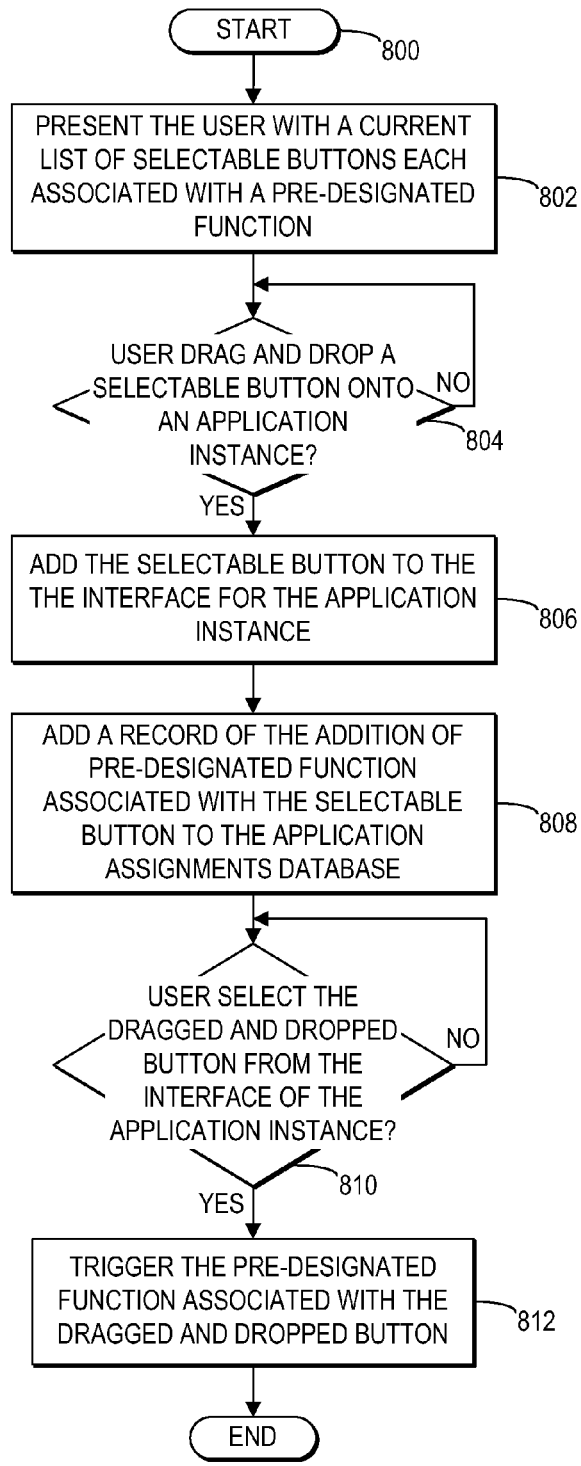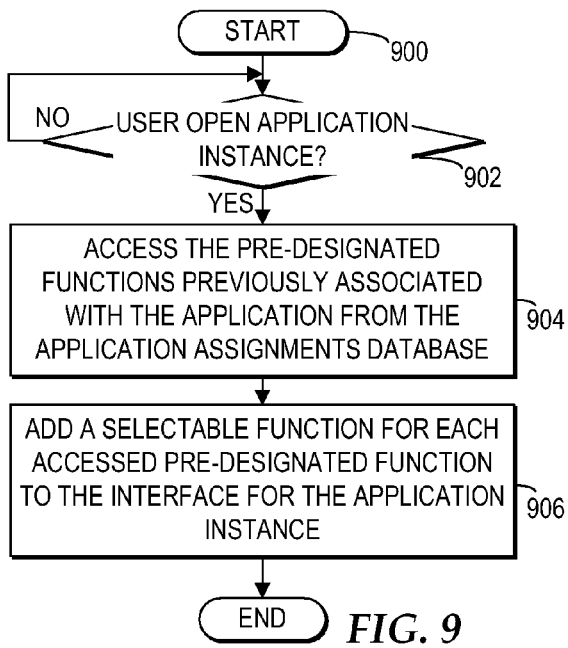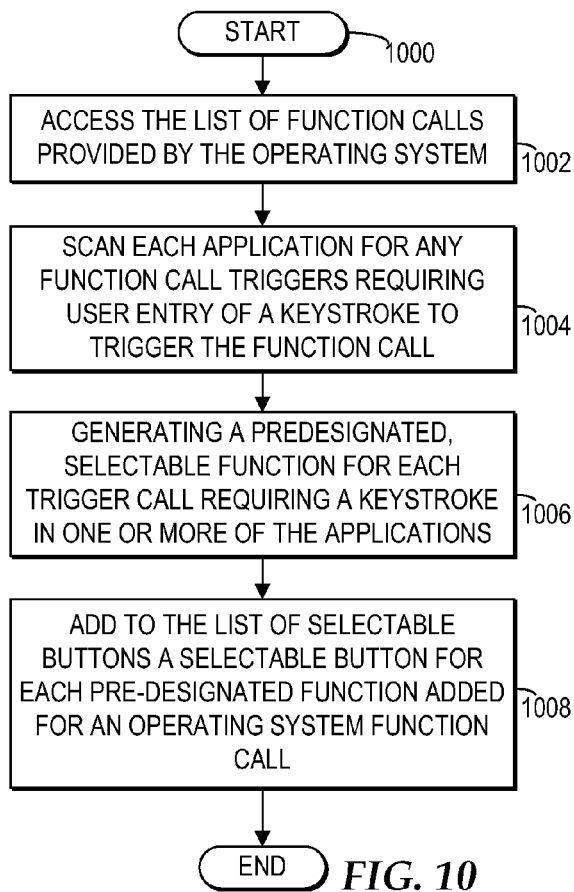
FIG. 8
FIG. 9
FIG. 10

ENABLING USER CONTROL OVER SELECTABLE FUNCTIONS OF A RUNNING EXISTING APPLICATION

TECHNICAL FIELD

The present invention relates in general to improving accessibility in a computer system. In particular, the present invention relates to enabling a user to control the selectable functions of an existing application directly presented in association with an interface of an instance of the running existing application.

DESCRIPTION OF THE RELATED ART

Many times, an application available to a user does not include all the functions that a user would like the application to have or does not present a function as a selectable option readily accessible to the user.

For example, an application may not provide the user with a selectable option to close a window of the application. Instead, for the user to implement the close window function, the user is required to enter a keyboard command to trigger closing the window of the application.

In another example, an application may provide the user with a selectable option to increase a font size, however the selectable option is buried within a layer of one of multiple pull-down menus. Thus, for the user to select the option to increase a font size, the user must know and enter a keystroke to trigger the increase font size function or the user must search through the pull-down menus to locate the selectable option to trigger the increase font size function.

Thus, regardless of whether an application does not provide a selectable option for a function or the application requires the user to search through pull-down menus for the selectable option, many applications and operating systems still provide interfaces that are not user friendly. In particular, many applications and operating systems are still not accessible to many users because to use an application or operating system, the user must learn keystrokes or search through layers of pull-down menus in an attempt to find a way to trigger the computer system to perform a desired function.

In view of the foregoing, it would be advantageous to provide a method, system, and program for improving user accessibility to computer systems by enabling a user control over the selectable functions of a running existing application.

SUMMARY OF THE INVENTION

Therefore, the present invention provides improved accessibility in a computer system. In particular, the present invention provides for enabling a user to control the selectable functions of an existing application directly presented in association with an interface of an instance of the running existing application.

A function management tool manages a first interface with a plurality of selectable buttons, each selectable button drag and droppable, and each selectable button associated with a separate pre-designated function. The function management tool detects a user selection to drag and drop a particular selectable button from the first interface of the management tool to a second interface of an instance of a running application from among the multiple applications accessible at a computer system, wherein the management tool runs separately from the multiple applications. Responsive to the management tool detecting the user select the dragged and dropped selectable button from within the second interface of the instance of the running application of the multiple applications, the management tool controls the instance of the running application of the multiple applications according to a particular pre-designated function of the dragged and dropped selectable button.

In addition, the function management tool monitors a separate selection of user activity associated with each interface of each separate instance of the plurality of existing applications. Monitoring user activity may include monitoring user selections of functions from pull-down menus and user triggered functions from a user-entered keystroke. The function management tool, for each separate selection of user activity, generates a separate pre-designated function to trigger a same set of functions triggered by each separate selection of user activity. In addition, the function management tool updates the first interface of the management tool to comprise a separate selectable button associated with each separate pre-designated function generated based on monitored user activity.

The function management tool may scan the existing applications to detect, for each existing application, a selection of functions from among the plurality of function calls provided by an operating system of said computer system and only triggered in the existing application through user entry of a keystroke. For each of the detected selection of functions, the function management tool generates a separate pre-designated function to trigger each separate operating system function call. The function management tool updates the first interface of the management tool to include a separate selectable button associated with each separate pre-designated function generated based on function calls requiring keystroke entry in at least one of the existing applications.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is a high level logic flowchart depicting a process and program for a function management tool managing drag and drop buttons with pre-designated functions and triggering the pre-designated functions;

FIG. 9 is a high level logic flowchart illustrating a process and program for a function management tool managing new interfaces of an application instance or new instances of an application; and FIG. 10 is a high level logic flowchart depicting a process and program for a function management tool determining which functions of an operating system to provide as pre-designated functions associated with a selectable button.

DETAILED DESCRIPTION OF THE PREFERRED EMBODIMENT

Figure 1:
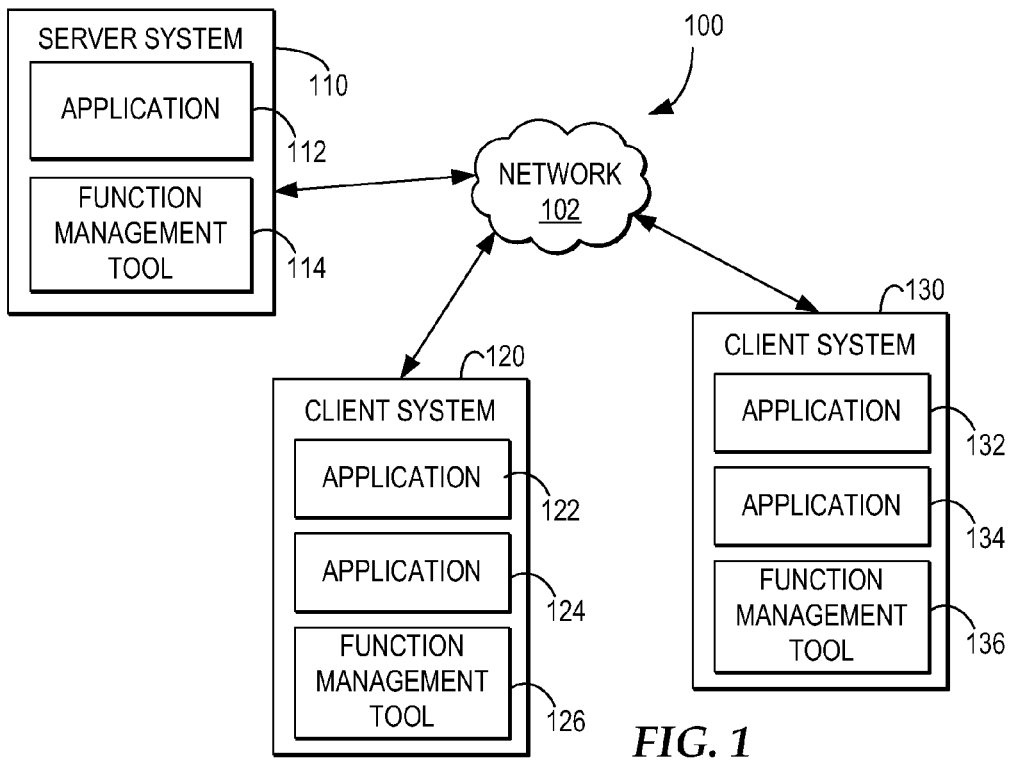
FIG. 1 is a block diagram illustrating a network environment in which the function management tool may be implemented.

With reference now to figures, and in particular with reference to FIG. 1, a block diagram illustrates a network environment in which the function management tool of the present invention may be implemented. It is important to note that network environment 100 is illustrative of one type of network environment in which network based application sharing and access may be implemented, however, the network based application sharing and access method, system, and program may be implemented in other network environments. In addition, it is important to note that the distribution of systems within network environment 100 is illustrative of a distribution of systems; however, other distributions of systems within a network environment may be implemented.

As illustrated, multiple systems within network environment 100 may be communicatively connected via network 102, which is the medium used to provide communications links between various devices and computer communicatively connected. Network 102 may include permanent connections such as wire or fiber optics cables and temporary connections made through telephone connections and wireless transmission connections, for example. Network 102 may represent both packet-switching based and telephony based networks, local area and wide area networks, and public and private networks. It will be understood that FIG. 1 is representative of one example of a distributed network for supporting application accessibility; however other network configurations and network components may be implemented for supporting and implementing application accessibility in the present invention.

Network environment 100 may implement multiple types of network architectures. In one example, network environment 100 may be implemented using a client/server architecture, where computing systems requesting data or processes are referred to as clients and computing systems processing data requests and processes are referred to as servers. In another example, network environment 100 may be implemented in a peer-to-peer network architecture. It will be understood that other types of network architectures and combinations of network architectures may be implemented.

As illustrated in FIG. 1, multiple systems may communicatively connect via network 102. In particular, for purposes of illustration, server system 110, client system 120, and client system 130 may each communicatively connect to one another via network 102. It will be understood that additional or alternate systems may communicatively connect via network 102.

Each of server system 110, client system 120, and client system 130 may include one or more applications or may access one or more applications run at one of the other systems via network 102. For example, server system 110 runs application 112. Client system 120 or client system 130 may also access application 112 as a network application from server system 110 via network 102. In addition, for example, client system 120 runs applications 122 and 124 and client system 130 runs applications 132 and 134, where the applications running on each of client systems 120 and 130 may also be accessed by other systems via network 102.

In addition, each of server system 110, client system 120, and client system 130 may include a function management tool, such as function management tools 114, 126, and 136, respectively. A system may run a function management tool at that system or may access the function management tool at another system via network 102. For example, client system 120 may access function management tool 114 from server system 110 via network 102.

As will be further described, a function management tool, such as each of function management tools 114, 126, and 146, facilitates an interface of one or more selectable buttons, where each selectable button is associated with a particular pre-designated function. A user may select to drag and drop one of the selectable buttons from the function management tool interface onto an interface of an instance of an opened, existing application running at a system or accessed by a system over network 102. The function management tool controls adding the selectable button to an interface of the instance of the running application. Then, responsive to a user selection of the dragged and dropped button, the function management tool triggers the pre-designated function associated with the dragged and dropped button, in association with the interface of the instance of the running application.

In addition, as will be further described, a function management tool, such as each of function management tools 114, 126, and 146, monitors user activity that triggers one or more functions. Then, the function management tool may generate a new pre-designated function and add a selectable button associated with the new pre-designated function to the function management tool interface, such that the user may select to drag and drop the new selectable button from the function management tool interface to an interface of a running, existing application instance.

Advantageously, a function management tool, such as each of function management tools 114, 126, and 146, enables a user to select to organize the functionality of multiple existing applications into a more uniform interface. In particular, a function management tool enables a user to select to place a selectable trigger for a particular function, which may already be provided in multiple diverse applications, in the same selectable position across the multiple diverse applications. For example, a user may drag and drop a selectable button associated with a spell check function in the same position on each interface of an instance of multiple diverse applications, such that the user need not search through pull-down menus of each application to find the spell checking function and such that the user need to remember a separate keystroke command required in each application to trigger the spell checking function. Thus, the selectable button is associated with the pre-designated function of a spell check function and is further associated with each separate command required to trigger the spell check function in each application.

In addition, the function management tool, such as each of function management tools 114, 126, and 146, enables a user to select to add functionality to an existing application that the programmer of the existing application did not select to add. For example, an operating system may provide a function call that when called by an existing application, triggers a function to close the window of the existing application. Some programmers may decide to add a selectable option to each window of an application where upon selection of the selectable option, a function call to the operating system to close the window is triggered. According to an advantage, in those applications where a programmer does not add the selectable option to close a window to the windows of the application, the function management tool detects that the user is required to enter a keystroke to close the window and generates a selectable button within the function management tool interface associated with the function call for closing the window. The user then has the option to drag and drop the selectable button associated with the function call for closing the window to the window of the instance of the running, existing application, such that the user controls the functions of an existing application directly provided within the interface of an instance of the running, existing application.

The term "application", as used herein, may refer to an operating system, firmware, desktop applications, network applications, and other types of executable programs. An interface for an instance of an existing application refers to a window, icon, or other representation of an instance of a running, existing application through which a user interacts with the instance of the running, existing application.

In addition, the term "tool" with reference to the function management tool, as used herein, may refer to an operating system function, a plug-in to an operating system, firmware, a desktop application, a network application, and other types of executable programs.

Examples of the term "function" as used herein may include, but are not limited to, functions such as closing a window, minimizing a window, maximizing a window, opening a new window, printing a window, checking spelling, searching, adjusting font characteristics, and adjusting paragraph characteristics. A "function" may include a function controlled by an application, a function controlled by an operating system, and a function controlled by a device driver, network driver, or other functional layer of a computer system.

Figure 2:
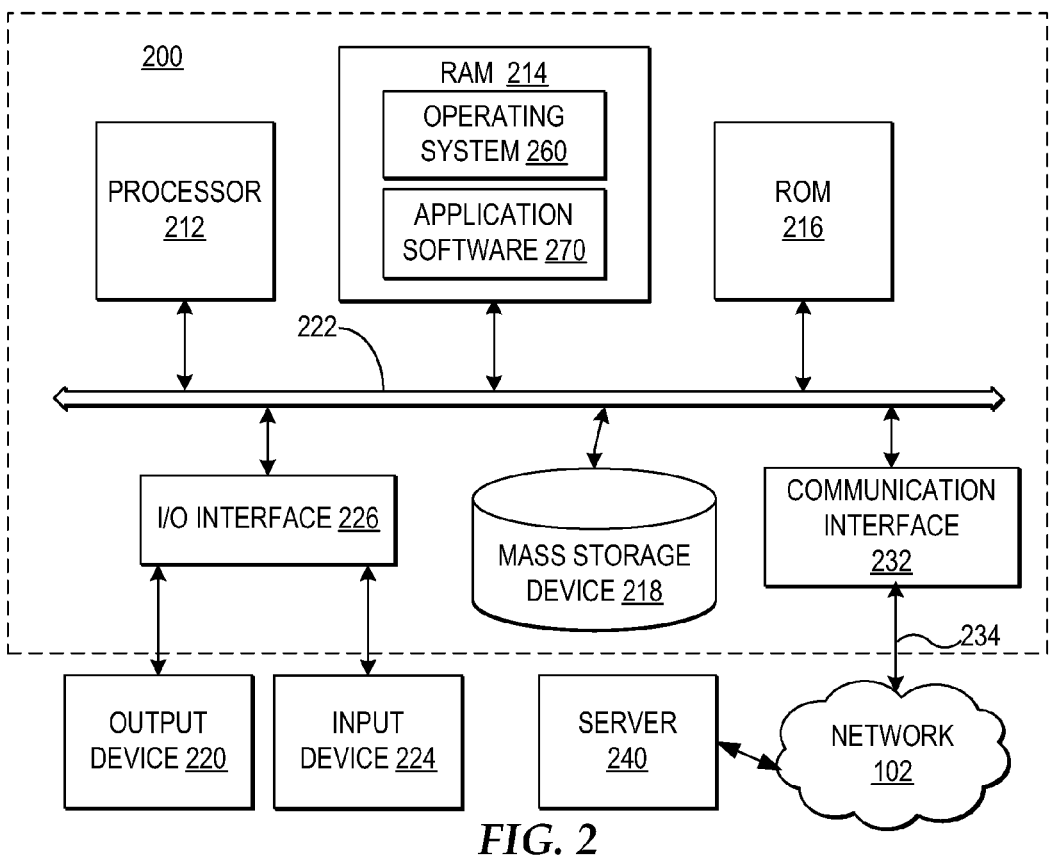
FIG. 2 is a block diagram depicting a computer system in which the present invention may be implemented.

With reference now to FIG. 2, a block diagram illustrates a computer system in which the present invention may be implemented. The controllers and systems of the present invention may be executed in a variety of systems, including a variety of computing systems, such as computer system 200, communicatively connected to a network, such as network 202.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as a server, computer system 200 may include multiple processors designed to improve network-servicing power. Where multiple processors share bus 222, an additional controller (not depicted) for managing bus access and locks may be implemented.

Processor 212 may be a general-purpose processor such as IBM's PowerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium.

In one embodiment, the operations performed by processor 212 may control a function management tool, as depicted in the operations of flowcharts of FIGS. 7-10 and other operations described herein. Operations performed by processor 212 may be requested by operating system 260, application software 270, middleware or other code or the steps of the present invention might be performed by specific hardware components that contain hardwired logic for performing the steps, or by any combination of programmed computer components and custom hardware components.

The function management tool of the present invention may be provided as a computer program product, included on a computer-readable or machine-readable medium having stored thereon the computer-readable program that when executed on computer system 200 causes computer system 200 to perform a process according to the present invention. The terms "computer-readable medium" or "machine-readable medium" as used herein includes any medium that participates in providing instructions to processor 212 or other components of computer system 200 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 200 can read and which is suitable for storing instructions. In the present embodiment, an example of a non-volatile medium is mass storage device 218, which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic or light waves, such as those generated during radio frequency or infrared data communications.

Moreover, the function management tool of the present invention may be downloaded or distributed as a computer program product, wherein the program instructions may be transmitted from a remote computer such as a server 240 to requesting computer system 200 by way of data signals embodied in a carrier wave or other propagation medium via network 202 to a network link 234 (e.g. a modem or network connection) to a communications interface 232 coupled to bus 222. In one example, where processor 212 includes multiple processor elements is, a processing task distributed among the processor elements, whether locally or via a network, may represent a consumer program product, where the processing task includes program instructions for performing a process or program instructions for accessing Java (Java is a registered trademark of Sun Microsystems, Inc.) objects or other executables for performing a process. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 202. Further, although not depicted, communication interface 232 may include software, such as device drivers, hardware, such as adapters, and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

Network link 234 and network 202 both use electrical, electromagnetic, or optical signals that carry digital data streams. The signals through the various networks and the signals on network link 234 and through communication interface 232, which carry the digital data to and from computer system 500, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a video capture device, a card reader, a body scanning system, a keyboard, a mouse, or other input peripheral device, communicatively enabled on bus 222 via I/O interface 226 controlling inputs. In addition, for example, an output device 220 communicatively enabled on bus 222 via I/O interface 226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
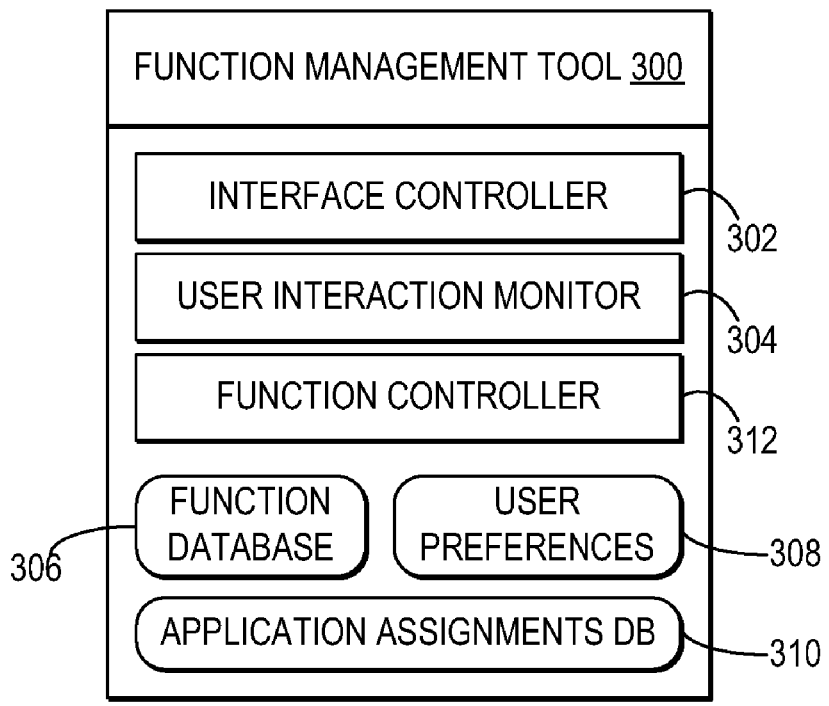
FIG. 3 is a block diagram illustrating one embodiment of the components of a function management tool.

Referring now to FIG. 3, a block diagram illustrates one embodiment of the components of a function management tool. It will be understood that additional or alternate components may be implemented within a function management tool and that a function management tool may be functionally distributed across one or more computing systems.

As illustrated, function management tool 300 includes a function database 306. Function database 306 includes an entry for each pre-designated function enabled by function management tool 300. User preferences 308 include a user's preferences as to which of the entries in function database 306 should be represented by separate selectable buttons in a selectable interface controlled by interface controller 302.

Interface controller 302 controls a list of selectable buttons, each associated with a pre-designated function. A user may drag and drop a selectable button from the list to an interface of an instance of a running, existing application. Interface controller 302 may also control an interface of an instance of a running, existing application onto which the button is dragged. In one example, interface controller 302 may direct the operating system to place each window of an application instance encapsulated within a function management window onto which the user may drag and drop buttons. In another example, interface controller 302 may direct the operating system to add selected buttons to a particular bar or defined graphical area of a window instance of an application. It will be understood that interface controller 302 may perform additional or alternate functions for controlling a graphical user interface to enable user placement of selectable buttons associated with pre-designated functions in association with an interface of an instance of a running, existing application.

For a pre-designated function entry in function database 306, one or more triggers or commands may be specified. In particular, a pre-designated function may require entry of one or more triggers and one or more commands consecutively or concurrently. In addition, a pre-designated function may include a different set of triggers or commands based on the application with which it is associated. For example, in one application, the keystroke "ctrl-K" triggers a spell check function, however, in another application, the keystroke "ctrl-shift-S" triggers a spell check function. Function database 306 may include a pre-designated function entry for the spell check function with the separate commands specified by application, such that a single selectable "spell check" button displayed by interface controller 302 is associated with the spell check function, but selection of the button triggers a different pre-designated command, based on the application instance from which the selectable button is triggered.

As a user selects to add selectable buttons to an interface of an instance of a running, existing application, interface controller 302 adds an entry in association with the application in an application assignments database (DB) 310. The entry indicates the pre-designated function associated with each selectable button added to an interface. By storing an entry indicating a pre-designated function for each selectable button added to an interface of an instance of a running, existing application, for a next instance of the application opened or for a next interface of the same application instance opened, interface controller 302 detects the entries for the existing application and automatically adds to the next interface a selectable button for each pre-designated function entry for the existing application within application assignments database 310.

In addition, a user may select to remove a selectable button from an interface of an instance of a running, existing application. In one example, a user may drag and drop a selectable button off the interface of an instance of a running, existing application. In another example, a user may remove the pre-designated function associated with a selectable button from function database 306, triggering interface controller 302 to remove the selectable button associated with the removed pre-designated function. Further, other types of graphical removal may be implemented and for each removal of a selectable button, application assignments database 310 is updated to indicate the current selectable button status.

Additionally, a user may select to drag and drop a copy of a selectable button from one interface of an application instance to another interface of another application instance. Interface controller 302 monitors each drag and drop of a selectable button and, responsive to detecting a user select a selectable button dragged and dropped from one interface of an application instance to another interface of another application instance, triggers function controller 312 to control execution of the function associated with the selected selectable button.

When a user selects one of the selectable buttons placed on the interface of an instance of a running, existing application, function controller 312 detects the selection and triggers execution of the pre-designated function associated with the selected selectable button. In triggering execution of the pre-designated function associated with the selected selectable button, function controller 312 determines from function database 306 whether for the particular application instance there is a particular trigger or command specified and controls triggering execution of the particular trigger or command.

As a user interacts with existing applications and selects functions of applications, operating system, or other executable programs, user interaction monitor 304 monitors the user selections and generates a pre-designated function for triggering the same functions triggered by the user selections. A pre-designated function monitored and generated by user interaction monitor 304 is added to function database 306. According to settings in user preferences 308, a user may select to place monitored functions within a list of preferred functions displayed by interface controller 302 or a user may select for interface controller 302 to automatically display a separate selectable button associated with each pre-designated function generated by user interaction monitor 304.

In addition, user interaction monitor 304 may anticipate potential user interactions and generate pre-designated functions for those potential interactions. In one example, user interaction monitor 304 scans the operating system to determine the function calls provided by the operating system. Then, user interaction monitor 304 scans each application to determine whether there are any function calls that an application calls, but which are only triggered by a user entering a keystroke and are not provided as a selectable option to the user. User interaction monitor 304 anticipates that to improve accessibility the user should be provided with a selectable button to trigger a function call and for those functions calls in applications where the user is not already provided with a selectable option, user interaction monitor 304 generates a pre-designated function and interface controller 302 may automatically add a selectable button for each of the pre-designated functions generated for a user to select to trigger and operating system function that otherwise would only be available through keystroke entry.

Figure 4:
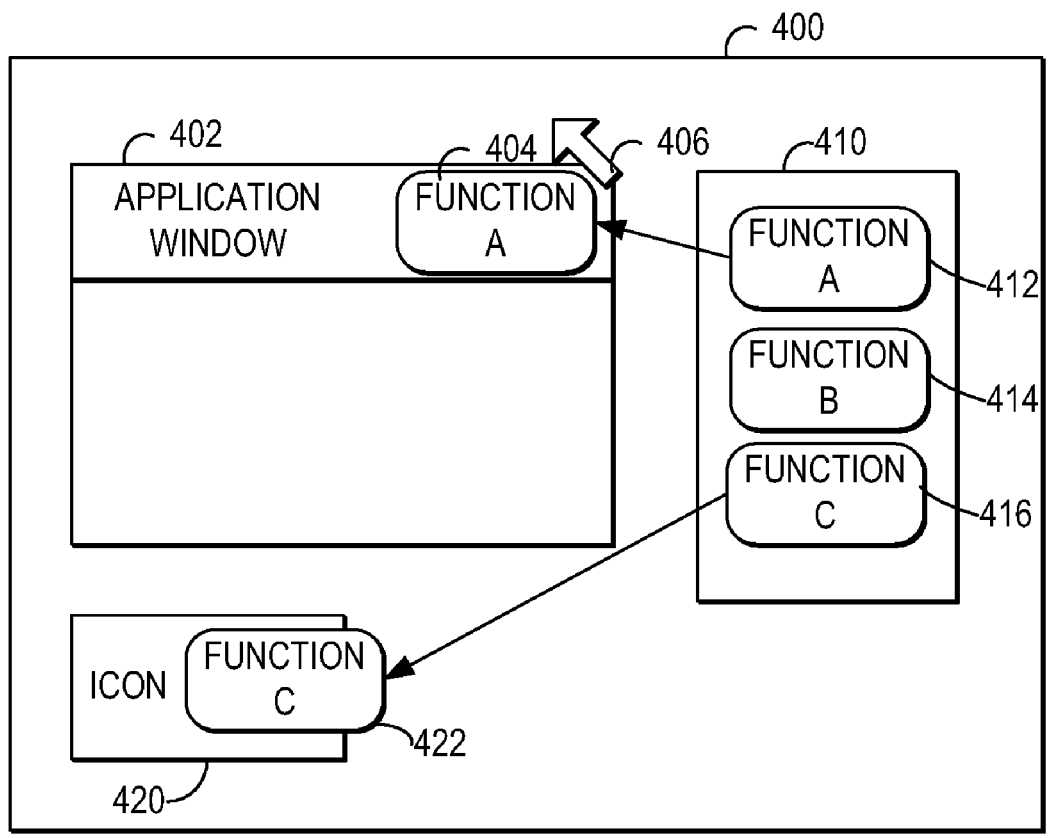
FIG. 4 is an illustrative diagram depicting one example of an interface of an application instance onto which a user drags and drops buttons with pre-designated functions.

With reference now to FIG. 4, an illustrative diagram depicts one example of an interface of an application instance onto which a user drags and drops selectable buttons associated with pre-designated functions. As illustrated, an interface 400 includes a function management tool bar 410. Function management tool bar 410 includes one or more selectable buttons, such as selectable buttons 412, 414, and 416, each associated with a pre-designated function.

A copy of each of selectable buttons 412, 414, and 416 can be dragged and dropped from function management tool bar 410 to an interface of an instance of a running, existing application. It will be understood that multiple types of inputs may be implemented for dragging and dropping buttons within interface 400.

In one example, an application window 402 represents an interface of an instance of a running, existing application. A user places a cursor 406 over selectable button 412, enters an input to select selectable button 412, drags a copy of selectable button 412 to application window 402, and drops the copy of selectable button 412 at a position illustrated at reference numeral 404, as controlled by interface controller 302 of function management tool 300. Upon user selection of the copy of the selectable button illustrated at reference numeral 404, a pre-designated function named "function A" is triggered with reference to application window 402. For example, if "function A" is the function "close window", then a user selection of the copy of the selectable button illustrated at reference numeral 404 triggers a command by function controller 312 to the operating system to close application window 402. In another example, if "function A" is the function "increase font size" and the application instance represented by application window 302 is triggered by a keystroke of "ctrl->" to increase the font size, then a user selection of the copy of the selectable button illustrated at reference numeral 404 triggers a command by function controller 312 to the application of "ctrl->".

In another example, an icon 420 represents a minimized interface of an instance of a running, existing application. A user places a cursor 406 over selectable button 416, enters an input to select selectable button 416, drags a copy of selectable button 416 to icon 420, and drops the copy of selectable button 416 at a position illustrated at reference numeral 422, as controlled by interface controller 302 of function management tool 300. In one embodiment, the copy of the selectable button illustrated at reference numeral 422 remains displayed in associated with icon 420. In another embodiment, the copy of the selectable button illustrated at reference numeral 422 disappears, but if icon 420 is triggered to maximize into a window, then the copy of the selectable button illustrated at reference numeral 422 is illustrated within the maximized window.

It is important to note that the application instance illustrated by application window 402 and the application instance illustrated by icon 420 may represent the same application or different applications. A user may place selectable buttons 412, 414, and 416 across multiple different interfaces for application instances for one or more existing applications, such that the user is enabled to select, through placement of selectable buttons each associated with a pre-designated function, which functions are directly selectively available from an interface of an instance of a running, existing application. In addition, for improving accessibility, a user may select one or more selectable buttons that are automatically added to each interface of each instance of each running, existing application, such that the user can quickly and easily locate a selection of functions in a same place across multiple existing applications, particularly in a system where the operating system or applications do not position the same functions in the same place across multiple applications.

Figure 5:
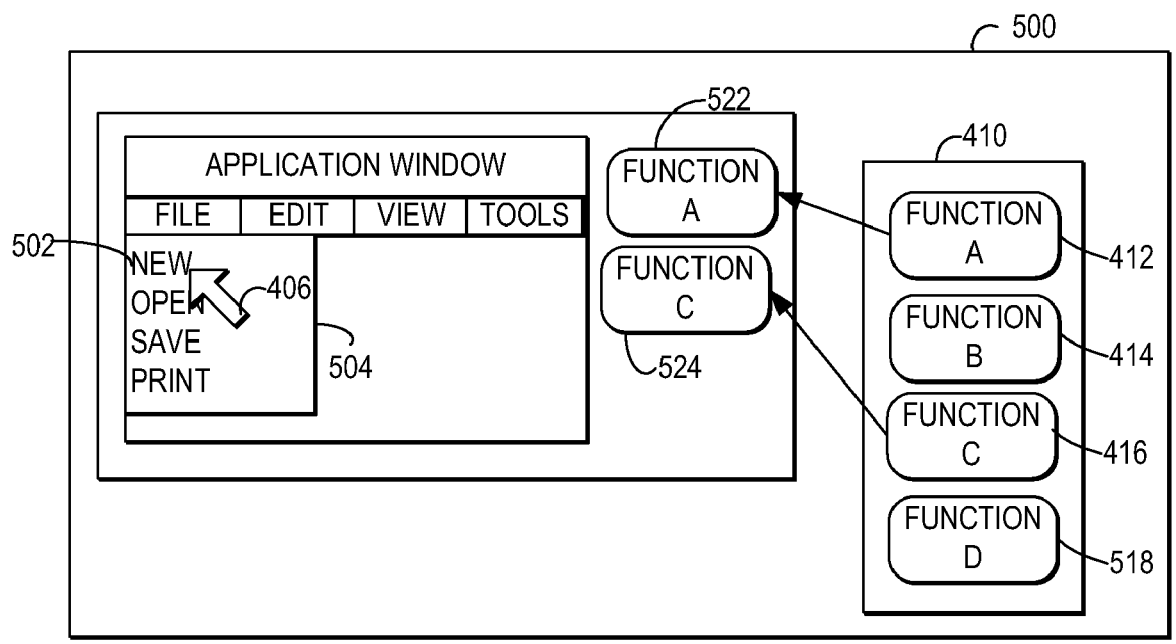
FIG. 5 is an illustrative diagram illustrating one example of a window encapsulating an interface of an application instance where a user drags and drops buttons with pre-designated functions onto the encapsulating window.

Referring now to FIG. 5, an illustrative diagram illustrates one example of a window encapsulating an interface of an instance of a running, existing application where a user drags and drops selectable buttons with pre-designated functions onto the encapsulating window. As illustrated, an interface 500 includes application window 402, which is an interface for an instance of a running, existing application. Interface controller 302 encapsulates each interface for an application instance encapsulated within a function management tool encapsulation window 520.

By placing each interface for an application instance, such as application window 402, within a separate function management tool encapsulation window, a user is enabled to drag and drop a copy of selectable buttons 412, 414, and 416 from function management tool bar 410 to function management tool encapsulation window 520. For example, a user drags and drops a copy of selectable button 412 to a position illustrated at reference numeral 522 within function management tool encapsulation window 520 and a copy of selectable button 416 to a position illustrated at reference numeral 524 within function management tool encapsulation window 520.

If a user selects a selectable button within function management encapsulation window 520, then function controller 312 triggers the pre-designated function associated with the selected selectable button to apply to application window 402.

In addition, user interaction monitor 304 may monitor the user's interaction with application 402 and generate a new selectable button 518 associated with a pre-designated function. In particular, user interaction monitor 304 detects a user select, from a pull-down menu 502, to trigger a function to open a new window, as illustrated at reference numeral 504. Responsive to detecting the user selection of a function from the pull-down menu, user interaction monitor 304 determines whether there is already a pre-designated function entry for the function of opening a new window in function database 306. If there is not an entry for the function, then user interaction monitor 304 generates within function database 306 a new pre-designated function entry, where the function of open a new window is associated with the command for opening a new window from pull-down menu 504. Additionally, interface controller 302 adds new selectable button 518 to function management tool bar 410, where selectable button 518 is associated with the pre-designated function "function D" which triggers opening a new window. Alternatively, if function database 306 already includes a pre-designated function entry for the function of opening a new window, user interaction monitor 304 determines whether there is already a trigger or command added to the pre-designated function entry for the application associated with application window 402. If there is not a trigger or command for the application associated with application window 402 in the pre-designated function entry, then user interaction monitor 304 adds the trigger based on the function triggered by opening a new window from pull-down menu 504.

Figure 6:
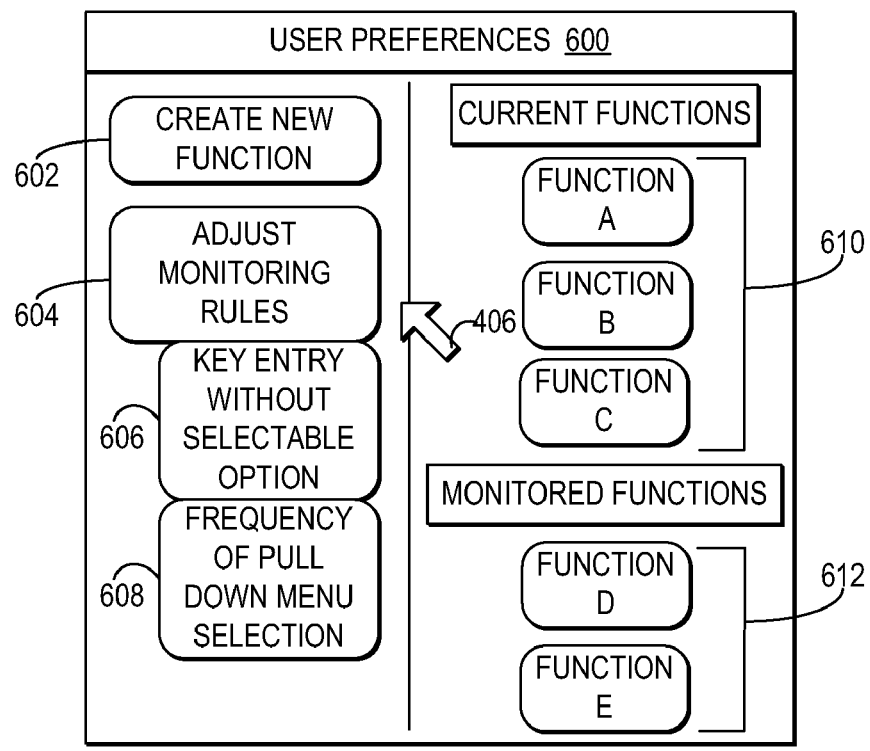
FIG. 6 is an illustrative diagram depicting one example of an interface for user selection of preferences in association with a function management tool.

With reference now to FIG. 6, an illustrative diagram depicts one example of an interface for user selection of preferences in association with a function management tool. In the example, an interface 600 includes multiple selectable options for user preferences, selectable in one example through user positioning of cursor 406 and entry of an input.

In the example, a user may view graphical representations of the pre-designated functions currently included within a list of current functions at reference numeral 610. The pre-designate functions currently included within a list of current functions specify those functions to be displayed within the function management tool selection bar.

In addition, in the example, a user may view graphical representations of the functions monitored and generated by user interaction monitor 304, but not yet added to the list of current functions, as illustrated at reference numeral 612. Although not depicted, the graphical representations of function monitored and generated by user interaction monitor 304 may include graphical attributes that distinguish these pre-designated functions.

A user may select to remove a pre-designated function from the list of current functions or move a pre-designated function from the monitored functions to the list of current functions by dragging and dropping the graphical representation of a particular function to a new position. In addition, a user may select to create a new pre-designated function by selecting selectable option 602. Upon selection of selectable option 602, a user may be prompted to perform user actions to trigger a pre-designated function or the user may enter the actions required to trigger a pre-designated function.

In addition, user preferences include monitoring rules for application by user interaction monitor 304. In the example, a user may select to add or modify monitoring rules by selecting selectable option 604. In addition, examples of current monitoring rules are depicted at reference numerals 606 and 608. For example, a monitoring rule illustrated at reference numeral 606 specifies to monitor for keystroke entries made by a user whether there is not a selectable option in a menu for the function. In another example, a monitoring rule illustrated at reference numeral 608 specifies monitoring the frequency at which a user chooses a function from a pull down menu selection. When user interaction controller 304 monitors frequency, the graphical representation of a pre-designated function generated for the function from the pull down menu may be adjusted in graphical characteristic to indicate the frequency with which the function is selected from the pull down menu.

Figure 7:
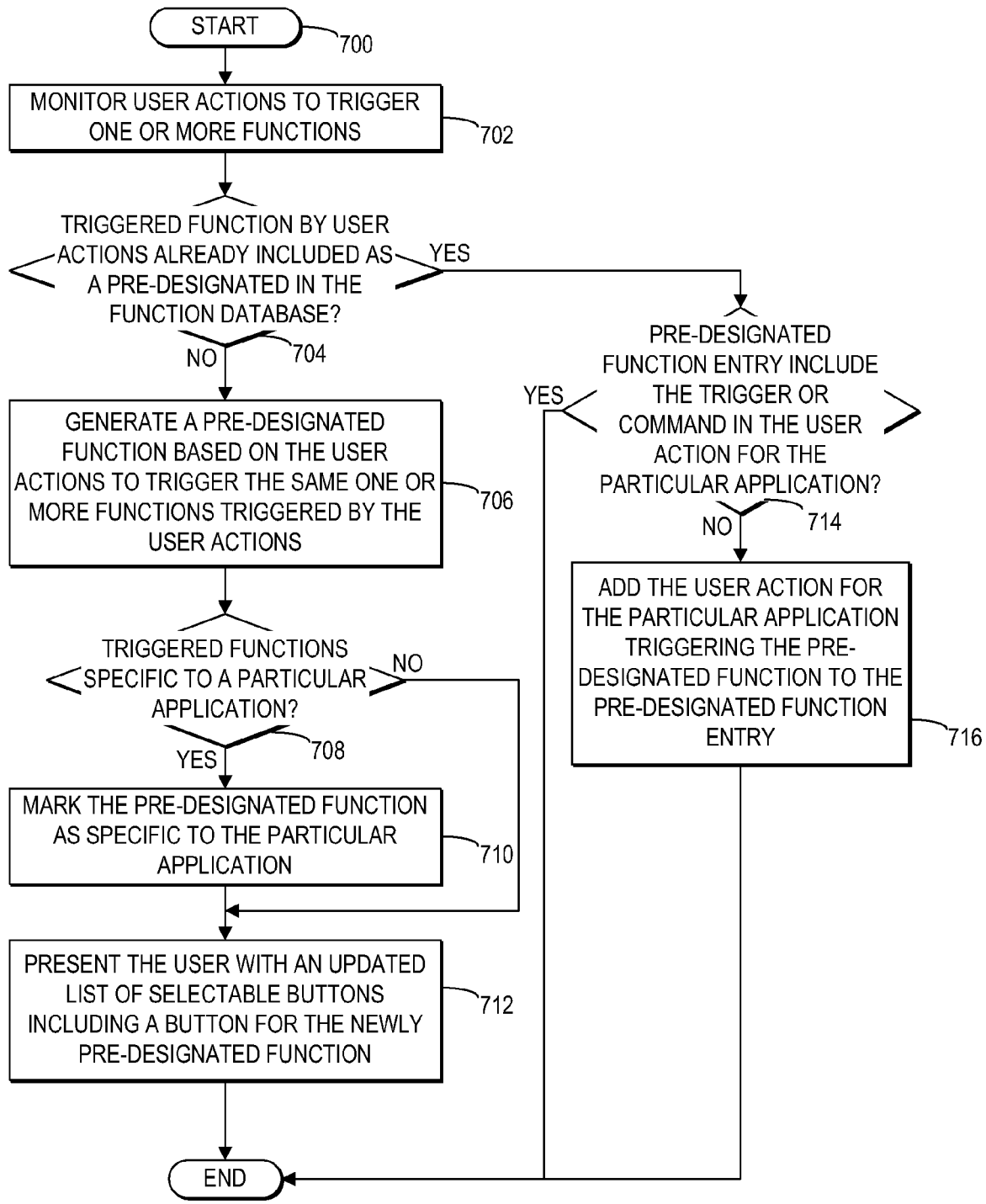
FIG. 7 is a high level logic flowchart illustrating a process and program for a function management tool monitoring and generating pre-designated functions for selection by a user.

Referring now to FIG. 7, a high level logic flowchart depicts a process and program for a function management tool monitoring and generating pre-designated functions for selection by a user. As illustrated, the process starts at block 700 and thereafter proceeds to block 702. Block 702 depicts monitoring user actions to trigger one or more functions. Next, block 704 depicts a determination whether the triggered function is already included as a pre-designated function in the function database. If the triggered function is already included as a pre-designated function in the function database, then the process passes to block 714.

Block 714 depicts a determination whether the user action triggering the function is already included as a trigger or command for the pre-designated function in the function database. If the user action triggering the function is already included as a trigger or command in the pre-designated function entry in the function database, then the process ends. If the user action triggering the function is not already included as a trigger or command in the function entry in the function database, then the process passes to block 716. Block 716 illustrates adding the trigger or command within the user action triggering the function to the pre-designated function entry in the function database, and the process ends.

Otherwise, returning to block 704, if the triggered function is already included in the function database, then the process passes to block 706. Block 706 illustrates generating a pre-designated function based on the user actions to trigger the same one or more functions triggered by the user actions. Thereafter, block 708 depicts a determination whether the triggered functions are specific to a particular application. If the triggered functions are specific to a particular application, then the process passes to block 710. Block 710 depicts marking the pre-designated function as specific to the particular application, and the process passes to block 712. In one example, the function management tool may determine whether the pre-designated function is specific to the particular application by determining whether the function is applicable on any other applications. For example, if the user action triggers closing a window and the operating system provides a programming interface through which a user may select to close a window, then the pre-designated function is not specific to the particular application.

Otherwise, returning to block 708, if the triggered functions are not specific to the particular application, then the process passes to block 712. Block 712 depicts presenting the user with an updated list of selectable buttons including a button for the newly pre-designated function, and the process ends. Alternatively, a user preference may designate for the user to be presented with the newly pre-designated function when reviewing the user preferences.

With reference now to FIG. 8, a high level logic flowchart depicts a process and program for a function management tool managing drag and drop buttons associated with pre-designated functions and triggering the pre-designated functions. As illustrated, the process starts at block 800 and thereafter proceeds to block 802. Block 802 depicts presenting the user with a current list of selectable buttons each associated with a separate pre-designated function. Next, block 804 illustrates a determination whether the user is detected as dragging and dropping a particular selectable button onto an interface of an instance of a running, existing application. If the user is detected as dragging and dropping a particular selectable button, then the process passes to block 806.

Block 806 depicts adding the selectable button to the interface for the application instance. Next, block 808 illustrates adding a record of the addition of a pre-designated function associated with the selectable button to the application assignments database. Thereafter, block 810 depicts a determination whether the user selects the placed button from the interface of the application instance. If the user selects the placed buttons from the interface of the application instance, then the process passes to block 812. Block 812 illustrates triggering the pre-designated function associated with the selected, placed button, and the process ends.

Referring now to FIG. 9, a high level logic flowchart depicts a process and program for a function management tool managing new interfaces of an application instance or new instances of an application. As illustrated, the process starts at block 900 and thereafter proceeds to block 902. Block 902 depicts a determination whether the user opens a new application instance or a new window of an application instance. If the user opens the new application instance or a new window of an application instance, then the process passes to block 904. Block 904 illustrates accessing the pre-designated functions previously associated with the application from the application assignments database. Next, block 906 depicts adding a selectable button for each accessed pre-designated function to the interface for the application instance, and the process ends.

With reference now to FIG. 10, a high level logic flowchart depicts a process and program for a function management tool determining which functions of an operating system to provide as pre-designated functions associated with a selectable button. In the example, the process starts at block 1000 and thereafter proceeds to block 1002. Block 1002 depicts accessing the list of function calls provided by the operating system. Next, block 1004 illustrates scanning each application for any function call triggers requiring user entry of a keystroke to trigger the function call. Thereafter, block 1006 depicts generating a pre-designated, selectable function for each trigger call requiring a keystroke in one or more of the applications. Next, block 1008 illustrates adding to the list of selectable buttons a selectable button for each pre-designated function added for an operating system function call, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for enabling a user to control at least one selectable function of an existing application, comprising:
   detecting a user drag and drop a particular selectable button from a first interface of a management tool to a second interface of an instance of a running application of a plurality of existing applications accessible at a computer system, wherein the management tool runs separately from the plurality of existing applications, wherein a particular pre-designated function is associated with the particular selectable button; and
   responsive to detecting the user select the dragged and dropped selectable button from within the second interface of the instance of the running application of the plurality of existing applications, controlling the instance of the running application of the plurality of existing applications according to the particular pre-designated function of the dragged and dropped selectable button.

2. The method according to claim 1, further comprising:
   monitoring a separate selection of user activity associated with each interface of each separate instance of the plurality of existing applications;
   for each separate selection of user activity, generating a separate pre-designated function to trigger a same set of functions triggered by each separate selection of user activity; and
   updating the first interface of the management tool to comprise a separate selectable button associated with each separate pre-designated function generated based on monitored user activity.

3. The method according to claim 2, wherein monitoring a separate selection of user activity associated with each interface of each separate instance of the plurality of existing applications, further comprises monitoring each selection of a function made by the user from a pull down menu within each interface of each separate instance of the plurality of existing applications.

4. The method according to claim 1, further comprising:
   scanning the plurality of existing applications to detect, for each of the plurality of existing applications, a selection of functions from among the plurality of function calls provided by an operating system of the computer system and only triggered in each of the plurality of existing applications through user entry of a keystroke;
   for each of the selection of functions, generating a separate pre-designated function to trigger a separate function call from among the plurality of function calls; and
   updating the first interface of the management tool to comprise a separate selectable button associated with each separate pre-designated function generated based on function calls requiring keystroke entry in at least one of the applications from among the plurality of existing applications.

5. The method according to claim 1, wherein the particular pre-designated function of the dragged and dropped selectable button comprises at least one from among closing a window, opening a new window, printing, minimizing a window, maximizing a window, increasing a font size, decreasing a font size, searching, and checking spelling.

6. The method according to claim 1, further comprising:
   detecting the user drag and drop the particular selectable button from the first interface of the management tool to a third interface of a third instance of one of the other running applications of the plurality of existing applications; and
   responsive to detecting the user select the dragged and dropped selectable button from the third interface, controlling the third running instance of one of the other running applications of the plurality of existing applications according to the particular pre-designated function of the dragged and dropped selectable button.

7. The method according to claim 1, wherein the particular pre-designated function of the dragged and dropped selectable button is also a function performed by the running application from among the plurality of existing applications.

8. The method according to claim 1, wherein the particular pre-designated function of the dragged and dropped selectable button is also a function performed by the operating system of the computer system.

9. A system including a processor for enabling a user to control at least one selectable function of an existing application, comprising:
   a computer system comprising a plurality of existing applications and a management tool that runs separately from the plurality of existing applications;
   the management tool for detecting a user drag and drop a particular selectable button from a first interface of the management tool to a second interface of an instance of a running application of the plurality of existing applications accessible at the computer system, wherein a particular pre-designated function is associated with the selectable button; and
   the management tool, responsive to detecting the user select the dragged and dropped selectable button from within the second interface of the instance of the running application of the plurality of existing applications, for controlling the instance of the running application of the plurality of existing applications according to the particular pre-designated function of the dragged and dropped selectable button.

10. The system according to claim 9, the management tool further comprising:
    means for monitoring a separate selection of user activity associated with each interface of each separate instance of the plurality of existing applications;
    for each separate selection of user activity, means for generating a separate pre-designated function to trigger a same set of functions triggered by each separate selection of user activity; and
    means for updating the first interface of the management tool to comprise a separate selectable button associated with each separate pre-designated function generated based on monitored user activity.

11. The system according to claim 10, wherein the means for monitoring a separate selection of user activity associated with each interface of each separate instance of the plurality of existing applications, further comprises means for monitoring each selection of a function made by the user from a pull down menu within each interface of each separate instance of the plurality of existing applications.

12. The system according to claim 9, the management tool further comprising:
    means for scanning the plurality of existing applications to detect, for each of the plurality of existing applications, a selection of functions from among the plurality of function calls provided by an operating system of the computer system and only triggered in each of the plurality of existing applications through user entry of a keystroke;
    for each of the selection of functions, means for generating a separate pre-designated function to trigger a separate function call from among the plurality of function calls; and
    means for updating the first interface of the management tool to comprise a separate selectable button associated with each separate pre-designated function generated based on function calls requiring keystroke entry in at least one of the applications from among the plurality of existing applications.

13. The system according to claim 9, wherein the particular pre-designated function of the dragged and dropped selectable button comprises at least one from among closing a window, opening a new window, printing, minimizing a window, maximizing a window, increasing a font size, decreasing a font size, searching, and checking spelling.

14. The system according to claim 9, the management tool further comprising:
    means for detecting the user drag and drop the particular selectable button from the first interface of the management tool to a third interface of a third instance of one of the other running applications of the plurality of existing applications; and
    means, responsive to detecting the user select the dragged and dropped selectable button from the third interface, for controlling the third instance of one of the other running applications of the plurality of application according to the particular pre-designated function of the dragged and dropped selectable button.

15. The system according to claim 9, wherein the particular pre-designated function of the dragged and dropped selectable button is also a function performed by the running application from among the plurality of existing applications.

16. The system according to claim 9, wherein the particular pre-designated function of the dragged and dropped selectable button is also a function performed by the operating system of the computer system.

17. A program product comprising a storage-type computer-usable medium including a computer-readable program for enabling a user to control at least one selectable function of an existing application, wherein the computer-readable program when executed on a computer cause the computer to:
    detect a user drag and drop a particular selectable button from a first interface of a management tool to a second interface of an instance of a running application of a plurality of existing applications accessible at a computer system, wherein the management tool runs separately from the plurality of existing applications, wherein a particular pre-designated function is associated with the selectable button; and
    responsive to detecting the user select the dragged and dropped selectable button from within the second interface of the instance of the running application of the plurality of existing applications, control the instance of the running application of the plurality of existing applications according to the particular pre-designated function of the dragged and dropped selectable button.

18. The program product according to claim 17, wherein the computer-readable program is transmitted over a network.

19. The program product according to claim 17, wherein the computer-readable program when executed on the computer further causes the computer to:
    monitor a separate selection of user activity associated with each interface of each separate instance of the plurality of existing applications;
    for each separate selection of user activity, generate a separate pre-designated function to trigger a same set of functions triggered by each separate selection of user activity; and
    update the first interface of the management tool to comprise a separate selectable button associated with each separate pre-designated function generated based on monitored user activity.

20. The program product according to claim 17, wherein the computer-readable program when executed on the computer further causes the computer to:
    scan the plurality of existing applications to detect, for each of the plurality of existing applications, a selection of functions from among the plurality of function calls provided by an operating system of the computer system and only triggered in each of the plurality of existing applications through user entry of a keystroke;
    for each of the selection of functions, generate a separate pre-designated function to trigger a separate function call from among the plurality of function calls; and
    update the first interface of the management tool to comprise a separate selectable button associated with each separate pre-designated function generated based on function calls requiring keystroke entry in at least one of the applications from among the plurality of existing applications.

* * * * *